(12) United States Patent
Whitcomb

(10) Patent No.: US 11,089,739 B2
(45) Date of Patent: Aug. 17, 2021

(54) AIR-ROOT-PRUNING CONTAINER HAVING VERTICALLY OFFSET LEDGES

(71) Applicant: Lacebark, Inc., Stillwater, OK (US)

(72) Inventor: Carl E. Whitcomb, Stillwater, OK (US)

(73) Assignee: Lacebark, Inc., Stillwater, OK (US)

( * ) Notice: Subject to any disclaimer, the term of this patent is extended or adjusted under 35 U.S.C. 154(b) by 208 days.

(21) Appl. No.: 16/439,437

(22) Filed: Jun. 12, 2019

(65) Prior Publication Data

US 2020/0390040 A1 Dec. 17, 2020

(51) Int. Cl.
*A01G 9/02* (2018.01)
*A01G 9/029* (2018.01)

(52) U.S. Cl.
CPC .............. *A01G 9/021* (2013.01); *A01G 9/029* (2018.02)

(58) Field of Classification Search
CPC ........... A01G 9/021; A01G 9/02; A01G 9/029
See application file for complete search history.

(56) References Cited

U.S. PATENT DOCUMENTS

| | | | |
|---|---|---|---|
| 754,948 A | 3/1904 | White | |
| 1,011,445 A | 12/1911 | Killion | |
| 1,845,522 A | 2/1932 | Rowley | |
| 2,405,056 A | 7/1946 | Rosenbloom | |
| 2,615,486 A | 10/1952 | Marcus | |
| 2,829,742 A | 4/1958 | Wallace | |
| 3,291,437 A | 12/1966 | Bowden et al. | |
| D215,122 S | 9/1969 | Satake | |
| 3,951,294 A | 4/1976 | Wilson | |
| 4,442,628 A * | 4/1984 | Whitcomb | A01G 9/029 47/65.5 |
| 4,497,132 A | 2/1985 | Whitcomb | |
| 4,510,712 A | 4/1985 | Whitcomb | |
| 4,574,522 A | 3/1986 | Reiger et al. | |

(Continued)

FOREIGN PATENT DOCUMENTS

| | | |
|---|---|---|
| WO | WO9700005 | 1/1997 |
| WO | WO9721339 | 6/1997 |
| WO | WO0135722 A1 | 5/2001 |

OTHER PUBLICATIONS

Whitcomb, Carl E. "Plant Production in Containers", copyright 1984 by Carl E. Whitcomb, revised 1988, pp. 1-175.

(Continued)

*Primary Examiner* — Kristen C Hayes
(74) *Attorney, Agent, or Firm* — Jeffrey L. Streets

(57) ABSTRACT

An air-root-pruning container for growing a plant and a unitary flat including a plurality of the containers. The air-root-pruning container includes a base and a sidewall upwardly extending from the base. The sidewall includes inwardly projecting ribs, each rib extending in an upward direction along the sidewall, and each rib having a first side and a second side. The sidewall further includes ledges extending from the first side of each rib, ledges extending from the second side of each rib, and holes through the sidewall, each hole being positioned adjacent a location where one of the ledges extends from one of the ribs. For each rib, each of the ledges extending from the first side of the rib extend from the rib at a location that is vertically offset from a location where each of the ledges extending from the second side of the rib extend from the rib.

19 Claims, 10 Drawing Sheets

(56) References Cited

U.S. PATENT DOCUMENTS

| | | | |
|---|---|---|---|
| 4,716,680 A | 1/1988 | Whitcomb et al. | |
| 4,730,953 A | 3/1988 | Tarko | |
| 4,753,037 A | 6/1988 | Whitcomb | |
| 4,793,097 A | 12/1988 | Whitcomb | |
| 4,920,695 A | 5/1990 | Garden | |
| 4,939,865 A | 7/1990 | Whitcomb et al. | |
| 5,099,607 A | 3/1992 | Lawton | |
| 5,241,784 A | 9/1993 | Henry | |
| 5,301,465 A | 4/1994 | Caferro | |
| 5,327,679 A | 7/1994 | Hawthorne | |
| 5,557,886 A * | 9/1996 | Whitcomb | A01G 9/02 47/73 |
| 5,768,825 A | 6/1998 | Reiger | |
| 6,195,938 B1 | 3/2001 | Kay | |
| 6,311,443 B1 | 11/2001 | Allazetta | |
| 6,453,610 B2 | 9/2002 | Tonkin et al. | |
| 6,481,593 B2 | 11/2002 | Banhagel | |
| 6,862,840 B1 | 3/2005 | Single | |
| 6,874,278 B2 | 4/2005 | Felknor et al. | |
| 7,210,266 B2 * | 5/2007 | Henry | A01G 9/021 47/32.7 |
| 7,481,025 B2 | 1/2009 | Whitcomb | |
| 7,774,981 B2 | 8/2010 | Whitcomb | |
| 7,810,275 B2 | 10/2010 | Whitcomb | |
| 8,033,048 B2 | 10/2011 | Whitcomb | |
| 10,798,881 B2 * | 10/2020 | Whitcomb | B29C 49/4823 |
| 2019/0274262 A1 * | 9/2019 | Whitcomb | A01G 9/021 |

OTHER PUBLICATIONS

Whitcomb, Carl E. "Plant Production in Containers", copyright 1984 by Carl E. Whitcomb, revised 1988, pp. 176-629.

Whitcomb, Carl E. "Plant Production in Containers II", copyright 1984 by Carl E. Whitcomb, revised 1988 and 2003, pp. 1-247.

Whitcomb, Carl E. "Plant Production in Containers II", copyright 1984 by Carl E. Whitcomb, revised 1988 and 2003, pp. 248-765.

Whitcomb, Carl E. "Plant Production in Containers II", copyright 1984 by Carl E. Whitcomb, revised 1988 and 2003, pp. 766-1129.

Carl Erwin Whitcomb, "Effects of Root Competition Between Trees and Turfgrass", An Abstract of a Dissertation submitted to the Graduate Faculty in Partial Fulfillment of the Requirements for the Degree of Doctor of Philosophy, p. 1-3, 52.

Carl E. Whitcomb, Eliot C. Roberts, and Roger Q. Landers, A Connecting Pot Technique for Root Competition Investigations Between Woody Plants or Between Woody and Herbaceous Plants, Ecology, vol. 50, No. 2, Early Spring 1969, p. 326-328.

Carl E. Whitcomb and Eliot C. Roberts, "Competition Between Established Tree Roots and Newly Seeded Kentucky Bluegrass", Agronomy Journal, vol. 65, Jan.-Feb. 1973, p. 126-129.

Ralph Reiger and Carl E. Whitcomb, "A Root Control System for Growing and Transplanting Trees", Ag Exp Sta Report, p. 843, 1983.

Carl Whitcomb, "Fabric liners to stop root circling in containers", unavailable paper published in 1983, but referenced on, p. 341-342 of book by Carl Whitcomb, Plant Production in Containers II, 2003.

Carl E. Whitcomb, "Root Development of Trees Grown in Field-Grow Fabric Containers Following Transplanting", Okla. State U. Ag Exp. Sta Research Report, p. 872, 1985.

Paper: Published in 1968 or 1969 copy unavailable. Subject: Using quart milk cartons with or without bottoms removed for growing tree seedlings. The milk cartons were positioned on a raised wire frame to prevent roots from growing into the soil below. This may have been the first situation where air-root-pruning occurred.

Jim Ward and Carl E. Whitcomb, Nursery Problems Solutions Through Research, Jun. 21, 1972, Experiment #13, "Effects of Time of Potting and Root Pruning on Growth and Root Distribution of Loquat Seedlings", p. 24-25.

Carl E. Whitcomb, "Growth of Carissa Grandiflora 'Boxwood Beauty' in varying media, containers and micronutrient levels", 9 pages, circa 1971.

Carl E. Whitcomb, Experiment #14, "Effects of Container Sidewall Porosity, Growing Media and Presence or Absence of Micronutrient Fertilizer on Root and Top Growth of Carissa Grandiflora Var. Boxwood Beauty", Nursery Problems Solutions Through Research, Jun. 5, 1971.

Randy E. Davis and Carl E. Whitcomb, "Effects of Propagation Container Size on Development of High Quality Seedlings", Reprint from the International Plant Propagators' Society, vol. 25, 1975.

Robert S. Birchell and Carl E. Whitcomb, "Effects of Container Design on Root Development and Regeneration", Nursery Research Field Day, Ag Exp Sta, OK State Univ, Oct. 1977, Research Report p. 760.

Robert D. Hathaway and Carl E. Whitcomb, "The Effects of Root Malformation During Propagation on Growth and Survival of Bur Oak", Nursery Research Field Day, Ag Exp Sta, OK State Univ, Oct. 1978, Research Report p. 777.

Sancho Dickinson and Carl E.Whitcomb, "Effects of Container Design on Root Quality", Nursery Research Field Day, Ag Exp Sta, OK State Univ, Oct. 1978, Research Report p. 777.

Elizabeth Williams and Carl E. Whitcomb, "Effects of Growing Media and Container Design on Growth of Tree Seedlings", Nursery Research Field Day, Ag Exp Sta, OK State Univ, Oct. 1979, Research Report p. 791.

John D. Gibson and Carl E. Whitcomb, "Producing Tree Seedlings in Square Bottomless Containers", Ornamentals South, Aug. 1980, p. 12-15.

Carl E. Whitcomb, "Effects of Container and Production Bed Color on Root Temperatures and Plant Growth", Nursery Research Field Day, Ag Exp Sta, OK State Univ, Oct. 1980, Research Report p. 803.

Steve Wall and Carl E. Whitcomb, "A Comparison of Commercial Containers for Growing Tree Seedlings", Nursery Research Field Day, Ag Exp Sta, OK State Univ, Oct. 1980, Research Report p. 803.

Carl E. Whitcomb, "Growing Tree Seedlings in Containers", Bulletin 755 Jan. 1981 Agricultural Experiment Station Div of Ag, OK State Univ, p. 18.

Carl E. Whitcomb, "An "Easy" Way to Grow Specimen Trees in the Field", Nursery Research Field Day, Ag Exp Sta, OK State Univ, Oct. 1981, Research Report p. 818.

Carl E. Whitcomb, "A Vertical Air-Root-Pruning Container", Reprints—vol. 31 International Plant Propagators Society Combined Proceedings for 1981, p. 591-596.

Carl E. Whitcomb, "Inproving Root System Quality", Reprint from Research Report p. 829 of the OK Ag Exp. Sta. Oct. 1982.

Ben Davis III and Carl E. Whitcomb, "Growing Pecan Seedlings in Containers", Reprint from Research Report p. 829 of the OK Ag. Exp. Sta. Oct. 1982.

Robert D. Hathaway and Carl E. Whitcomb, Nutrition and Performance of Container-Grown Japanese Black Pine Seedlings, J. Environ. Hort. 2 (1):9-12. Mar. 1984.

Robert D. Hathaway and Carl E. Whitcomb, "Container-Grown Pecan Seedlings Good Nutrition, Root Pruning Technique to Get Seedlings Off to Quick Start", Pecan South, Jan. 1985, p. 14-19.

Carl E. Whitcomb, Roots for the Future, The International Plant Propagators' Society, Combined Proceedings vol. 39, 1989, p. 170-173.

Dr. Carl Whitcomb, "The Rootmaker Container", Florida Nurseryman Oct. 1989, p. 23-29.

"Container designed to aid plant's root development", Nursery Manager, Apr. 1991, p. 22.

Carl E. Whitcomb, "Top Ten Points of Plant Propagation", Combined Proceedings International Plant Propagators' Society, vol. 48, 1988, p. 558-561.

Carl E. Whitcomb, "Avoiding the Staking Delemma", published in the International Plant Propagators Soc. Proceedings, vol. 50, 2000.

Carl Whitcomb, "Seedling Development: The Critical First Days ©", Combined Proceedings International Plant Propagators' Society, vol. 51, 2001 p. 610-614.

Carl E. Whitcomb, Containers vs. Poly Bags—Which are better?, Reprinted from the Jan. 1, 1983, container production special issue of American Nurseryman.

(56) References Cited

OTHER PUBLICATIONS

Carl E. Whitcomb and Jerry D. Williams, "Stair-step Container for Improved Root Growth", HortScience 20(1) 66-67, 1985.
Dr. C. E Whitcomb, "Effects of pot sizes on rooting of juniper cuttings", Jan. 15, 1974, p. 15, 73-74.
James D. Ward and Carl E. Whitcomb, "Nutrition of Japanese Holly during Propagation and Production", J. Amer. Soc. Hort. Sci 104(4)P-:523-526. 1979.
Carl E. Whitcomb, "Effect of Micronutrient Nutrition During Propagaton ON Container Plant Production", Reprints vol. 30 International Plant Propagators' Society Combined Proceedings for 1980, p. 468-473.
Carl E. Whitcomb, Allan Storjohann and William D. Warde, "Micromax—Micronutrients for Improved Plant Growth", Reprints vol. 30 International Plant Propagators' Society Combined Proceedings for 1980, p. 462-467.
Carl E. Whitcomb, Ralph Reiger and Mike Hanks, "Growing Trees in Wire Baskets", Journal of Ariculture 7 (6): Jun. 1981, p. 158-160.
Frank E. Babcock and Carl E. Whitcomb, "N-P-K Effects on Tree Seedling Growth", Agriculture Exp. Sta. OK State University Research Report p. 843, 1983.
Carl E. Whitcomb, "Why Large Trees Are Difficult to Transplant", Journal of Arboriculture 9(2): Feb. 1983, p. 57-58.
Michael Carney and Carl E. Whitcomb, "Effects of 2 Slow-Release Fertilizers on the Propagation and Subsequent Growth of 3 Woody Plants", J. Environ. Hort. 1(3):P-55-58, Sep. 1983.
Bonnie Lee Appleton and Carl E. Whitcomb, "Effects of Container Size and Transplanting Date on the Growth of Tree Seedlings", J. Environ. Hort. 1(4):P-89-93. Dec. 1983.
C. Chris Threadgill, Carl e. Whitcomb and Ronald McNew, "Effects of Propagation Container Dimensions and Media on the Growth of 4 Nursery Crops", J. Environ. Hort. 3(3):P-126-131 Sep. 1985.
Whitcomb, Carl E., "Plant Production in Containers", Copyright 1984 by Carl E. Whitcomb, revised 1988.
Whitcomb, Carl E. "Plant Production in Containers II", Copyright 1984 by Carl e. Whitcomb, revised 1988 and 2003.
Carl Whitcomb PhD., "The Obsolete Taproot"; Landscape Contractor vol. 7, #8, pp. 22, 66, 67, Aug. 2004.
Carl E. Whitcomb and Andy C. Whitcomb; "Solutions for Pot-in-Pot Root Escape, Root Circling and Heat Shock at Harvest"; The International Plant Propagators Society Proceedings, 2004, vol. 54.

\* cited by examiner

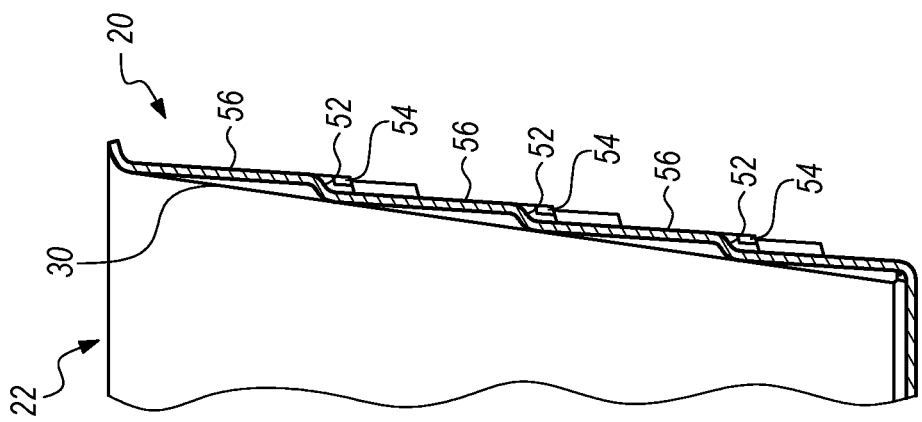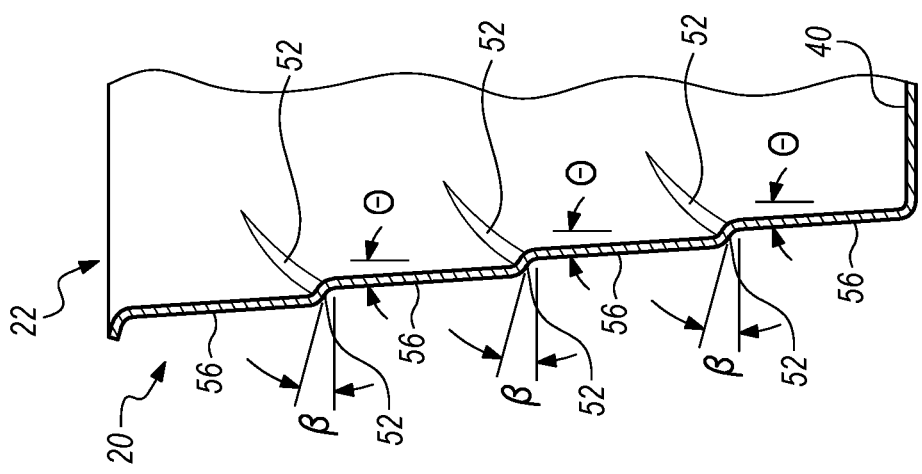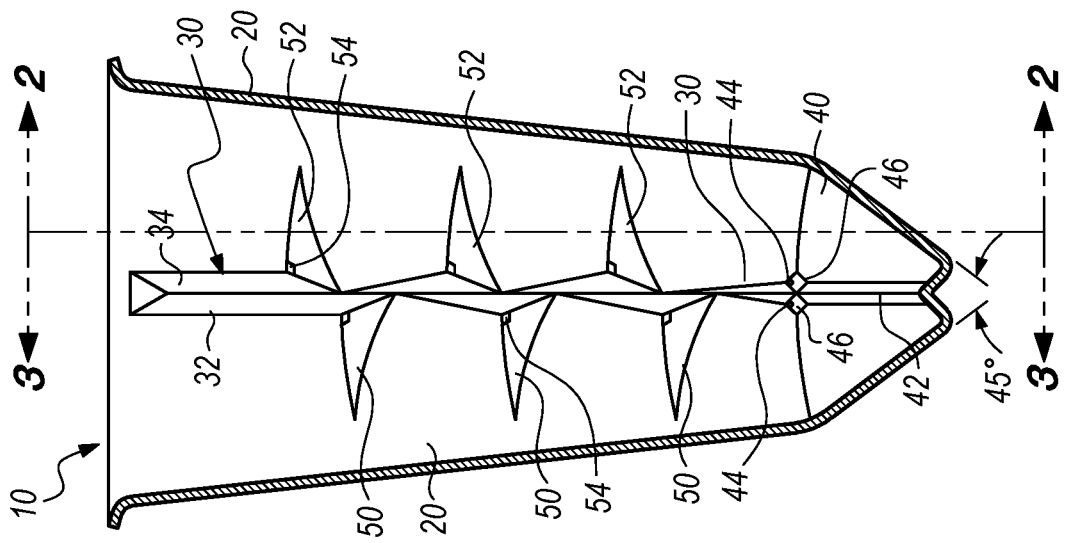

AIR-ROOT-PRUNING CONTAINER HAVING VERTICALLY OFFSET LEDGES

BACKGROUND

The present invention relates generally to an air-root-pruning container for growing a plant.

Background of the Related Art

Landscape plants and other plants intended to be transplanted have, for some time, been grown out-of-doors in containers above ground. Container-grown plants can be grown at a faster rate than those grown in the field. Furthermore, the roots of container plants are not severed or otherwise disturbed when the plants are transplanted, such that transplanting can take place at any time during the year rather than just during the early spring as required with bare root or bagged nursery stock.

A variety of containers have been developed and previously used for growing plants that are intended to be transplanted. Such containers range from metal cans having drainage openings punched in the bottoms to modern plastic containers. However, various, especially woody plants, will commonly experience problems plants when grown in conventional containers. These problems may include spiral root growth and generally downward root orientation with little lateral root development.

In some containers having open bottoms, the roots may become air-pruned when they reach the bottom, wherein the portion of each root extending into the air is killed by desiccation. However, the root tips are still at the bottom of the container rather than being laterally directed to the sides of the plant. It has been shown that the root growth of container-grown plants after being transplanted primarily involves the extension of roots which were present in the container at the time of transplanting as opposed to the development of new roots. Consequently, the number, position and orientation of root tips present at the time of transplanting is very important to the rapid establishment and ultimate survival of container-grown plants.

BRIEF SUMMARY

One embodiment provides an air root pruning container for growing a plant. The air root pruning container comprises a base and a sidewall upwardly extending from the base. The sidewall includes a plurality of inwardly projecting ribs, each rib extending in an upward direction along the sidewall, and each rib having a first side and a second side. The sidewall further includes a plurality of ledges extending from the first side of each rib, a plurality of ledges extending from the second side of each rib, and a plurality of holes through the sidewall, each hole being positioned adjacent a location where one of the ledges extends from one of the ribs. For each rib, each of the ledges extending from the first side of the rib is vertically offset from each of the ledges extending from the second side of the rib.

Another embodiment provides an apparatus comprising a unitary flat that includes a plurality of air-root-pruning containers for growing plants. Each air root pruning container comprises a base and a sidewall upwardly extending from the base. The sidewall includes a plurality of inwardly projecting ribs, each rib extending in an upward direction along the sidewall, and each rib having a first side and a second side. The sidewall further includes a plurality of ledges extending from the first side of each rib, a plurality of ledges extending from the second side of each rib, and a plurality of holes through the sidewall, each hole being positioned adjacent a location where one of the ledges extends from one of the ribs. For each rib, each of the ledges extending from the first side of the rib is vertically offset from each of the ledges extending from the second side of the rib.

BRIEF DESCRIPTION OF THE SEVERAL VIEWS OF THE DRAWINGS

FIG. 1 is a perspective view of one section of a sidewall in an air-root-pruning container for growing plants.

FIG. 2 is a cross-sectional view of the sidewall taken along line 2-2 in FIG. 1.

FIG. 3 is a cross-sectional view of the sidewall taken along line 3-3 in FIG. 1.

DETAILED DESCRIPTION

Figure 4:
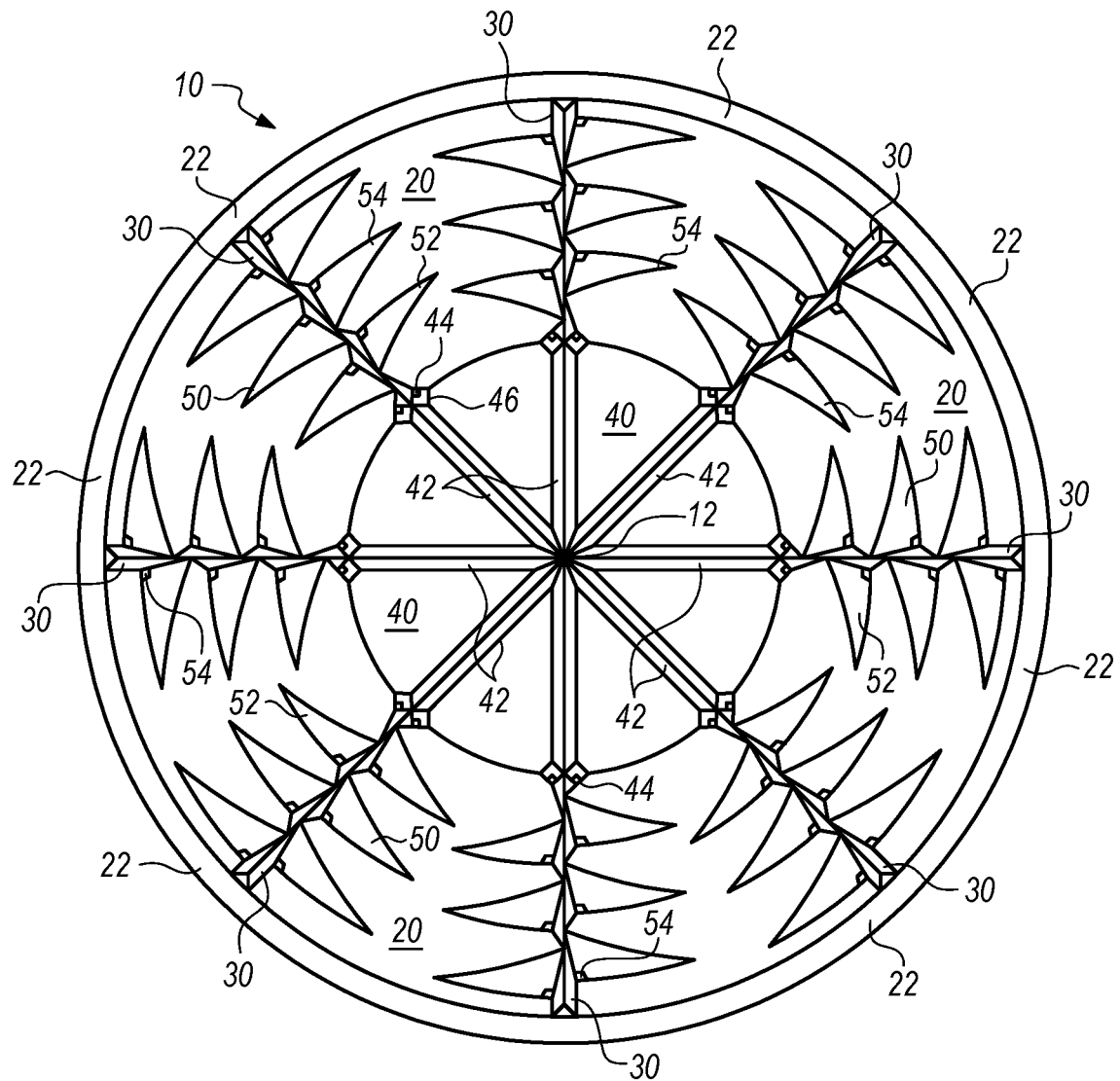
FIG. 4 is a top view of an air-root-pruning container including a plurality of the sections described in reference to FIGS. 1-3.

One embodiment provides an air-root-pruning container for growing a plant. The air-root-pruning container comprises a base and a sidewall upwardly extending from the base. The sidewall includes a plurality of inwardly projecting ribs, each rib extending in an upward direction along the sidewall, and each rib having a first side and a second side. The sidewall further includes a plurality of ledges extending from the first side of each rib, a plurality of ledges extending from the second side of each rib, and a plurality of holes through the sidewall, each hole being positioned adjacent a location where one of the ledges extends from one of the ribs. For each rib, each of the ledges extending from the first side of the rib is vertically offset from each of the ledges extending from the second side of the rib.

The air-root-pruning container is suitable for receiving a growth medium, such as dirt, in which a plant is grown. Specifically, the plant may be grown from a seed or transplanted from a smaller container into the air-root-pruning container. As the roots of the plant grow downwardly and outwardly, each root may engage the based or the sidewall at some point and become redirected. The base and sidewalls of the air-root-pruning container are configured to prevent root circling and redirect roots a short distance along the sidewall to one of the holes where the end of the root will be air-root-pruned.

The base may have any suitable shape, but is preferably a generally curvilinear shape, such as a circle or oval, or a regular convex polygon, such as a hexagon or octagon. It should be recognized that the shape of the base may be interrupted by ribs or other features of the container base or sidewall. Furthermore, the sidewalls upwardly extend the base such that the sidewalls may take on a shape similar to the base. For example, if the base is generally circular then the sidewalls may be generally circular and if the base is generally hexagonal then the sidewalls may be generally hexagonal. Typically, the sidewalls will extend upwardly from a perimeter of the base and flair outwardly to some extent In one embodiment, the container is made from a single thermoplastic sheet that is shaped by a vacuum forming process. The resulting container may be characterized as a single plastic workpiece having a generally consistent thickness.

Each rib projects inward from the sidewall and extends in an upward direction along the sidewall. The rib should project inward a sufficient distance to prevent root from circling along the sidewall of the container. As a non-limiting example, the rib may project inwardly at least ¼ inch and perhaps up to 1 inch or more, depending upon the size of the container. Each rib may be have various profiles, but one embodiment is a V-shaped rib having a first side formed by a first leg and a second side formed by a second leg. The rib may form an outward-facing open channel.

The sidewall includes a plurality of ledges extending from the first side of each rib and a plurality of ledges extending from the second side of each rib. For the purpose of air-root-pruning, a plurality of holes are provided through the sidewall, with each hole being positioned adjacent a location where one of the ledges extends from one of the ribs. This is a location where roots may be redirected after engaging a rib, ledge or upright portion of the sidewall. Any one of the holes may be formed in a ledge at a location immediately adjacent a rib and upright portion of the sidewall, formed in a rib immediately adjacent a ledge and upright portion of the sidewall, formed in the upright portion of the sidewall immediately adjacent a rib and ledge, or formed in two or more of a rib, ledge and upright portion of the sidewall. As non-limiting examples, the holes may be formed either by drilling or melting with a hot pointed instrument.

For each rib, each of the ledges extending from the first side of the rib is vertically offset from each of the ledges extending from the second side of the rib. Without any vertical offset in a pair of ledges on the opposing first and second sides of the rib, the two holes that are formed adjacent the pair of ledges may be somewhat aligned and are only separated by the width of the outward-facing, open channel formed by the rib. Accordingly, a root that has been directed to a first one of the pair of holes may exit the growth medium through the first hole and re-enter the growth medium through a second one of the pair of holes. However, embodiments providing a vertical offset of the ledges on the first and second sides of the rib will have a greater distance of separation between any two of the holes. Furthermore, none of the holes formed in a ledge on the first side of a given rib will be aligned with any hole associated with a ledge on the second side of the given rib. The vertical offset of the ledges on either side of a rib provides both greater distance between any two holes and intentional misalignment of those holes. As a result, roots are prevented from extending between holes and the root system is more completed air-pruned. With the roots air-pruned in this manner, the root system may branch out to a greater extent and the root ball may be easier to remove from the container.

Each of the ledges may extend from a rib in a lateral direction along the sidewall. For example, the ledge may be horizontal relative to a vertical central axis of the container or may be sloped relative to the horizontal. In some embodiments, the ledge may be sloped downward toward the hole adjacent the location where the ledge and rib come together. An upward facing surface of each ledge may prevent some or all roots from extending downward along the sidewall to the bottom of the container by redirecting the roots laterally to the hole where the root may be air-pruned.

In one embodiment, each of the plurality of ledges extending from the first or second side of a given rib may have an upwardly facing surface that narrows with increasing distance from the rib. In other words, such a ledge tapers until it extends no further. Each of these narrowing ledges may slope downwardly toward the rib regardless of which side of the rib they are positioned. Optionally, a plurality of ledges extending from a first rib toward a second rib that is adjacent to the first rib may be vertically offset from a plurality of ledges extending from the second rib toward the first rib. While it is not required for ledges of adjacent ribs to be vertically offset, this option may allow for the ledges extending from the first rib toward the second rib to overlap with the ledges extending from the second rib toward the first rib.

In another embodiment, a continuous ledge may extend along the sidewall from a first rib to a second rib adjacent to the first rib. The continuous ledge may have a consistent or variable width, but terminates only at the point where the ledge extends from the adjacent ribs. In some embodiments, each of the ledges may be continuous ledges having an upward surface with either a continuous slope between the first rib and the second rib or two or more regions between the first rib and the second rib, each region having a different slope. Each ledge may be horizontal or may have any angle relative to horizontal. For example, the angle may be stated relative to a vertical central axis of the container.

Embodiments provide a vertical offset of the elevation where each of a first plurality of ledges extend from the first side of a given rib relative to the elevation where each of a second plurality of ledges extend from the second side of the given rib, such that no two holes are directly across a rib from each other. In some embodiments, the plurality of ledges extending from the first side of a given rib and the plurality of ledges extending form the second side of the given rib may form an alternating side-to-side pattern with distance in the upward direction of the rib. Optionally, one or more of the plurality of ledges extending from the first side of a given rib may be positioned at an elevation along the given rib near a midpoint between the elevations of two adjacent ledges extending from the second side of the given rib. In any embodiment, the number of ledges on the first side of a rib may or may not be equal to the number of ledges on the second side of a rib.

In some embodiments, the base may include a plurality of inwardly projecting ribs. Ribs in the base may have a size and shape intended to prevent root circling along the base and direct roots that engage the base toward an air-root-pruning hole in the container. For example, the base may include ribs that are radially directed from a central axis of the container. In one option, the base may include a plurality of ribs, such that, for each rib in the sidewall, the rib in the sidewall aligns with one of the plurality of ribs in the base to form a plurality of continuous ribs. In a further option, the container includes a second plurality of holes, where each hole in the second plurality of holes may be positioned adjacent a location where one of the continuous ribs turns from the sidewall to the base. Each hole in the second plurality of holes is preferably elevated above a supporting surface of the base so that any roots exiting one of the hole will be air-root-pruned. Optionally, an inclined portion may be located between the sidewall, base and continuous rib to direct roots upward toward a hole.

Another embodiment provides an apparatus comprising a unitary flat that includes a plurality of air-root-pruning containers for growing plants. Each air root pruning container comprises a base and a sidewall upwardly extending from the base. The sidewall includes a plurality of inwardly projecting ribs, each rib extending in an upward direction along the sidewall, and each rib having a first side and a second side. The sidewall further includes a plurality of ledges extending from the first side of each rib, a plurality of ledges extending from the second side of each rib, and a plurality of holes through the sidewall, each hole being positioned adjacent a location where one of the ledges extends from one of the ribs. For each rib, each of the ledges extending from the first side of the rib is vertically offset from each of the ledges extending from the second side of the rib.

Some embodiments of the container may have no back slopes relative to vertical, such that the container can be easily removed from a vacuum forming mold and also so that any root ball can be easily removed from the container. A feature of the container has a "back slope" if the distance from the feature to the vertical central axis gets smaller with increasing elevation relative to the central axis. In some embodiments, the sidewalls may have successively larger cross-sectional dimensions with distance from the base. For example, if the upright portions of the sidewall do not have any back slopes, then they may be vertical or sloped outward with increasing elevation. Furthermore, each ledge formed in the sidewall may have an upwardly facing surface of some width that further increases the cross-sectional dimensions of the container with distance from the base. By contrast, an upwardly extending rib in the sidewall may or may not have a consistent slope spanning across multiple ledges.

FIG. 1 is a perspective view of one section of a sidewall 20 in an air-root-pruning container 10 (see FIG. 5) for growing plants. The section is illustrated as a representative 45 degree section of a generally circular container. For example, a container may include 8 such sections to form a 360 degree sidewall and base of the container.

The illustrated section of the sidewall 20 includes an inwardly projecting rib 30. The rib 30 extends upwardly along the sidewall 20 from a base 40 to a point near the open top 22 of the container. The rib is generally V-shaped, with the point directed inwardly toward the center of the container and forming a first side 32 and a second side 34. The first and second sides 32, 34 may be legs that form an open V-shaped channel on the reverse side of the sidewall 20. In fact, the outside surface of the container may be assumed to be the complement of the inside surface for the present embodiment.

A first plurality of ledges 50 extend along the sidewall 20 from the first side 32 of the rib 30 and a second plurality of ledges 52 extend along the sidewall 20 from the second side 34 of the rib 30. The ledges 52, 54 shown in this embodiment narrow with distance from the rib 30 and slope downwardly toward the rib 30 from either side. For each ledge 50, 52, a hole 54 is formed through the sidewall 20 in a position adjacent the location where the respective ledge extends from the rib 30. In the illustrated non-limiting example, there are three ledges 50 extending from the first side 32 of the rib 30 and three ledges 52 extending from the second side 34 of the rib 30. Each of the six ledges 50, 52 has a hole 54 formed in the respective ledge immediately adjacent the respective side 32, 34 of the rib 30 and immediately adjacent the upright portion of the sidewall 20 that extends upward from the ledge. Alternatively, one or more of the holes 54 may be formed in the rib immediately adjacent the ledge and the upright portion of the sidewall, formed in the upright portion of the sidewall immediately adjacent the rib and the ledge, or formed in some combination of two or more of the ledge, rib and upright portion of the sidewall.

Note that each of the ledges 50 extending from the first side 32 of the rib 30 are vertically offset from each of the ledges 52 extending from the second side 34 of the rib 30. In particular, the elevations at which each ledge 50 meets the first side 32 of the rib 30 are different from the elevations at which each ledge 52 meets the second side 34 of the rib 30. Accordingly, the holes 54 in the ledges 50 on the first side 32 of the rib 30 are not at the same elevation as, or aligned with, the holes 54 in the ledges 52 on the second side 34 of the rib 30. Furthermore, the distance between any two of the six holes 54 is greater than the width of the rib 30.

The base 40 also includes a radial rib 42 that may align with the upwardly extending rib 30 in the sidewall 20. As shown, the ribs 30, 42 form a continuous rib that extends along the sidewall 20 and then turns to extend along the base 40. Optionally, the ribs 30, 42 may have the same profile, such as the V-shaped profile shown.

Embodiments may further include holes 44 on either side of the continuous rib 30, 42 in the area where the base 40 and sidewall 20 come together. Accordingly, roots growing along the base 40 between the sidewall 20 and the rib 42 or growing along the sidewall 20 between the base 40 and the rib 30 may be directed to the holes 44 to be air-pruned. The holes 44 may be located on an inclined portion 46 that forms an upward slope and raises the holes 44 above the plane of the base 40. Even if the holes 44 are at the same elevation, raising the holes above the plant of the base 40 increases the likelihood that any roots extending through the holes 44 will be air-pruned before they can reach another growth medium, such as if the container is set directly on the ground.

FIG. 2 is a cross-sectional view of the sidewall 20 taken along line 2-2 in FIG. 1. When viewed in the direction of the arrow 2, the cross-section of the sidewall 20 illustrates the ledges 52 and the upright portions 56 above and below each the ledges 52. The ledges 52 are shown with an optional angle β that is just off horizontal, and the upright portions 56 are shown with an optional angle θ that is just off vertical.

FIG. 3 is a cross-sectional view of the sidewall taken along line 3-3 in FIG. 1. When viewed in the direction of the arrow 3, the cross-section of the sidewall 20 illustrates the ledges 52 and the upright portions 56 above and below each of the ledges 52. The ledges 50 and the upright portions 56 may have the same or different optional angles β and θ as in FIG. 2.

The rib 30 extends along the sidewall 20 and may have a continuous slope that may follow a pitch line defined by the ledges 52 and/or the ledges 50 on the opposing side of the rib 30. In the view of FIG. 3, it is also possible to see the holes 54 from the outside, underneath surface of the ledges 52.

FIG. 4 is a top view of an air-root-pruning container 10 including eight of the sections 22 described in reference to FIGS. 1-3. While eight sections 22 are shown, each section having one upwardly extending rib 30, embodiments of the air-root-pruning container may have any number of sections and ribs. It may occur that a container with a smaller diameter or other dimension may have smaller and/or fewer ribs 30, 42, and it may occur that a container with a larger diameter or other dimension may have larger and/or more ribs. Similarly, it may occur that a container with a smaller height or other dimension may have smaller and/or fewer ledges 50, 52, and it may occur that a container with a larger height or other dimension may have larger and/or more ledges. However, the container may have any number, size, shape and spacing of ribs and ledges, so long as the ledges extending from opposing sides of a rib are vertically offset. For example, each rib could be the same or different from one or more other rib, and each ledge could be the same or different from one or more other ledge. Still further, the ledges extending from one rib may or may not overlap the ledges extending from an adjacent rib.

The ribs 30 that project inwardly from the sidewall 20 may be generally evenly spaced about a perimeter of the container 10, and an equal number of inwardly projecting ribs 42 in the base 40 may be aligned and formed with the ribs 30 to form continuous ribs. However, embodiments are not required to have evenly spaced ribs or an equal number of ribs in the sidewall and base. Optionally, the ribs 42 in the base 40 extend to the center of the base, which center may coincide with a central axis 12 of the container 10.

The container 10 is shown with 40 total ledges 50, 52, each ledge being associated with a hole 54 that provides for air-pruning of roots that are redirected into one of the holes. However, the number of ledges and associated holes may vary. The container is further shown with 16 inclined portions 46, each inclined portion being associated with a hole 44 that provides for air-pruning of roots that are redirected into one of the holes.

Figure 5A:
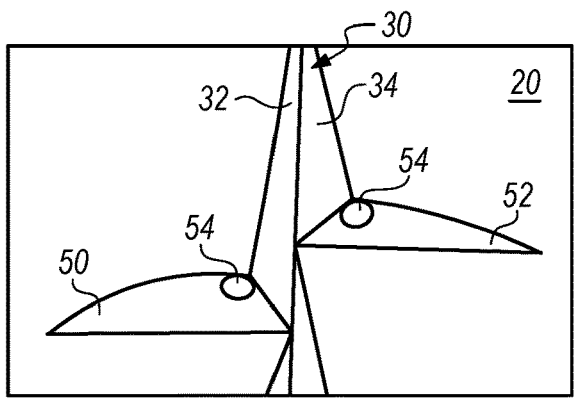
FIGS. 5A-5D are diagrams of air-root-pruning holes through the sidewall, where each hole is positioned adjacent a location where one of the ledges extends from one of the ribs.
Figure 5B:
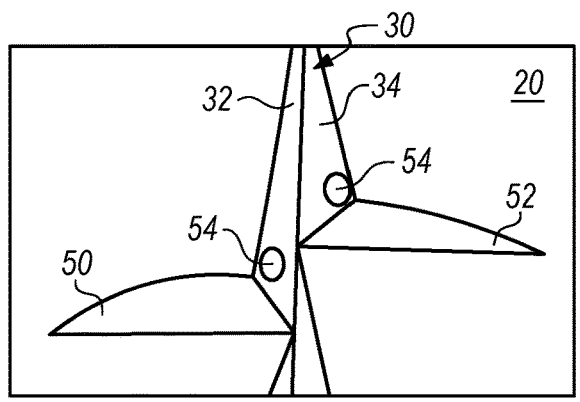
Figure 5C:
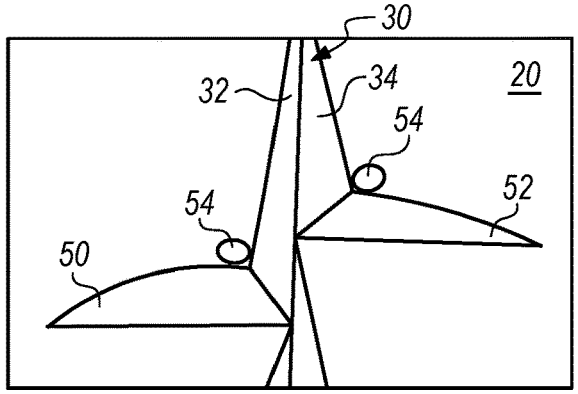
Figure 5D:
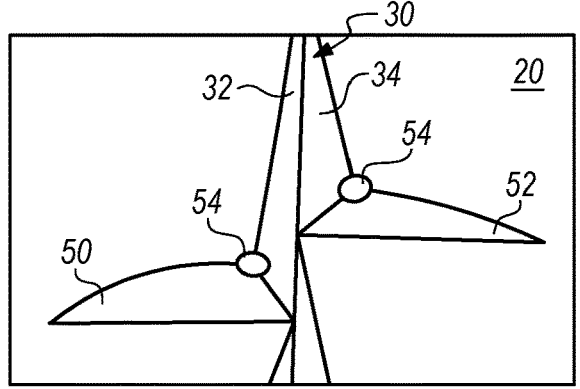

FIGS. 5A-5D are diagrams of air-root-pruning holes 54 through the sidewall 20, where each hole 54 is positioned adjacent a location where one of the ledges 50, 52 extends from one of the ribs 30. In FIG. 5A, the holes 54 are positioned substantially in each of the ledges 50, 52 adjacent the rib 30. For example, the ledge 50 includes a hole 54 adjacent the left side 32 of the rib 30 and an upright portion of the sidewall 20, and the ledge 52 includes a hole 54 adjacent the right side 34 of the rib 30 and an upright portion of the sidewall 20. In FIG. 5B, the holes 54 are positioned substantially in the rib 30 adjacent each of the ledges 50, 52. For example, the left side 32 of the rib 30 includes a hole 54 adjacent the ledge 50 and an upright portion of the sidewall 20, and the right side 34 of the rib 30 includes a hole 54 adjacent the ledge 52 and an upright portion of the sidewall 20. In FIG. 5C, the holes 54 are positioned substantially in the upright portion of the sidewall 20 adjacent the rib 30 and one of the ledges 50, 52. For example, the upright portion of the sidewall 20 includes a hole 54 adjacent the ledge 50 and the left side 32 of the rib 30, and the upright portion of the sidewall 20 includes a hole 54 adjacent the ledge 52 and the right side 34 of the rib 30. In FIG. 5D, the holes 54 are positioned in some combination of the rib 30, one of the ledges 50, 52, and the upright portion of the sidewall 20. For example, a hole 54 may be partially positioned in the ledge 50, partially positioned in an upright portion of the sidewall 20, and/or partially positioned in the left side 32 of the rib 30. Similarly, a hole 54 may be partially positioned in the ledge 52, partially positioned in an upright portion of the sidewall 20, and/or partially positioned in the right side 34 of the rib 30. FIGS. 5A-5D are non-limiting examples of holes being positioned adjacent a location where one of the ledges extends from one of the ribs.

Figure 6A:
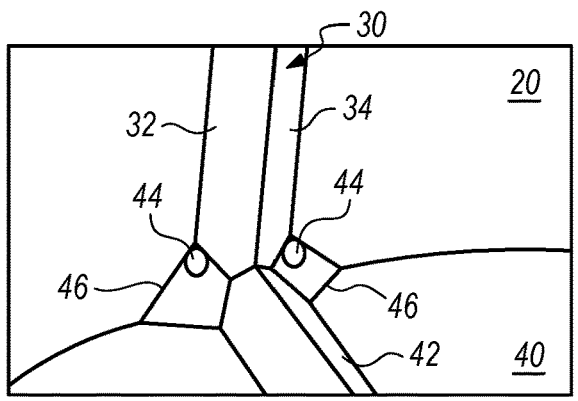
FIGS. 6A-6D are diagrams of air-root-pruning holes through the sidewall, where each hole is positioned adjacent a location where one of the inclined portions meets one of the ribs.
Figure 6B:
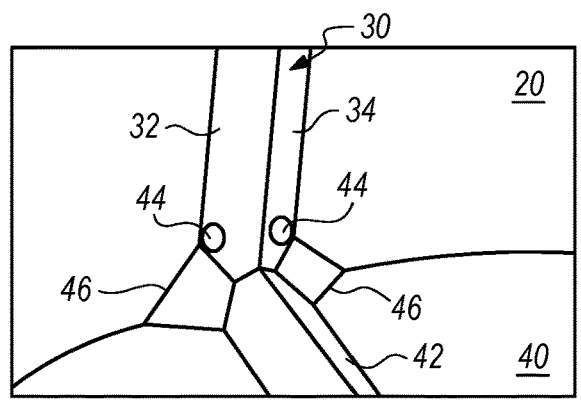
Figure 6C:
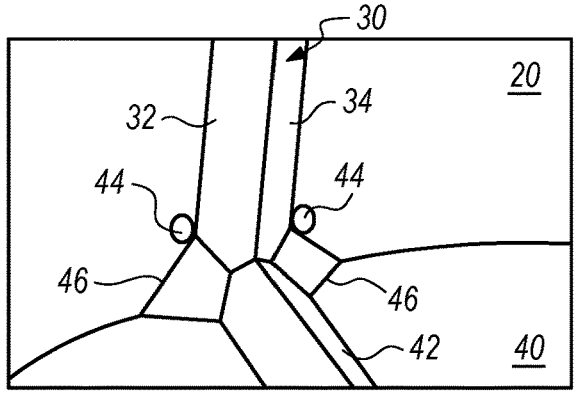
Figure 6D:
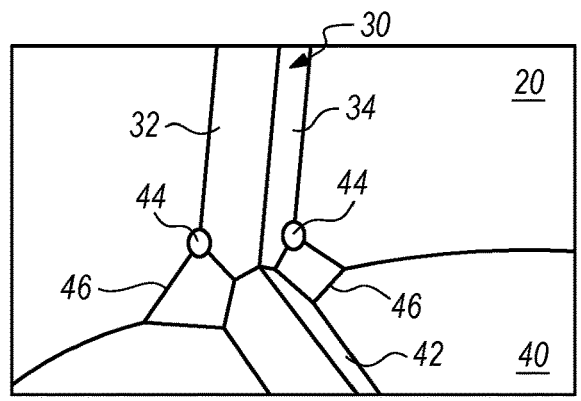

FIGS. 6A-6D are diagrams of air-root-pruning holes 44 through the sidewall 20, where each hole 44 is positioned adjacent a location where one of the continuous ribs turns from the sidewall 20 to the base 40. In FIG. 6A, the holes 44 are positioned substantially in one of the inclined portions 46 adjacent the rib 30 and an upright portion of the sidewall 22. For example, a first inclined portion 46 on the left of the rib 30 includes a hole 44 adjacent the left side 32 of the rib 30 and an upright portion of the sidewall 20, and a second inclined portion 46 on the right of the rib 30 includes a hole 44 adjacent the right side 32 of the rib 30 and an upright portion of the sidewall 20. In FIG. 6B, the holes 44 are positioned substantially in the rib 30 adjacent each of the inclined portions 46 and an upright portion of the sidewall 20. For example, the left side 32 of the rib 30 includes a hole 44 adjacent the first inclined portion 46 and an upright portion of the sidewall 20, and the right side 34 of the rib 30 includes a hole 44 adjacent the second inclined portion 46 and an upright portion of the sidewall 20. In FIG. 6C, the holes 44 are positioned substantially in the upright portion of the sidewall 20 adjacent the rib 30 and one of the inclined portions 46. For example, the upright portion of the sidewall 20 includes a hole 44 adjacent the first inclined portion 46 and the left side 32 of the rib 30, and the upright portion of the sidewall 20 includes a hole 44 adjacent the second inclined portion 46 and the right side 34 of the rib 30. In FIG. 6D, the holes 44 are positioned in some combination of the rib 30, one of the inclined portions 46, and the upright portion of the sidewall 20. For example, a hole 44 may be partially positioned in the first inclined portion 46, partially positioned in an upright portion of the sidewall 20, and/or partially positioned in the left side 32 of the rib 30. Similarly, a hole 44 may be partially positioned in the second inclined portion 46, partially positioned in an upright portion of the sidewall 20, and/or partially positioned in the right side 34 of the rib 30. FIGS. 6A-6D are non-limiting examples of holes being positioned adjacent a location where one of the continuous ribs turns from the sidewall to the base, wherein each hole in the second plurality of holes is elevated above a supporting surface of the base 40.

Figure 7:
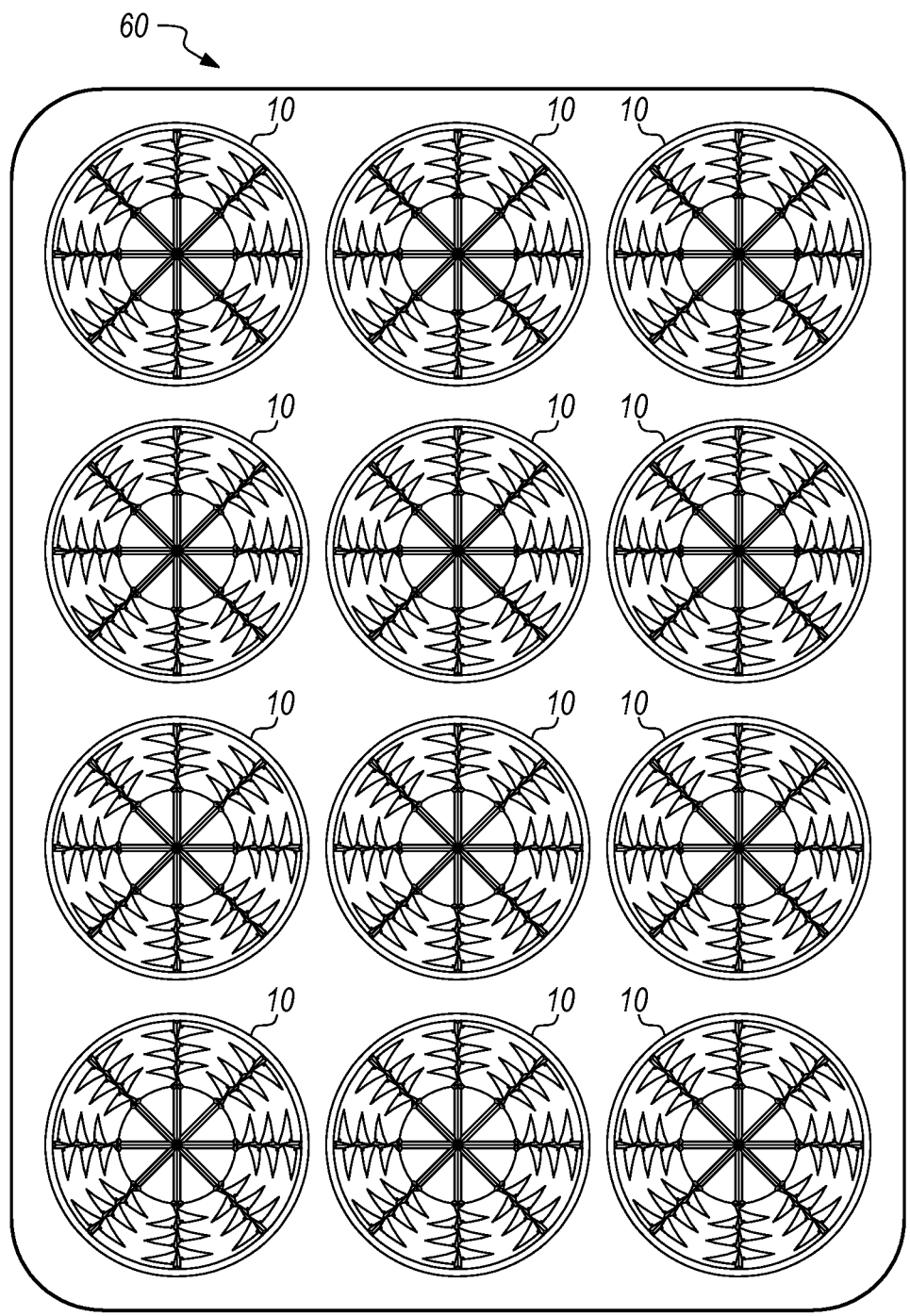
FIG. 7 is a top view of a unitary flat including a plurality of air-root-pruning containers.

FIG. 7 is a top view of a unitary flat 60 including a plurality of the air-root-pruning containers 10. The unitary flat 60 may be a single workpiece with each of the containers 10 joined at their rims. For example, the unitary flat 60 may be made by vacuum forming a single sheet of a thermoplastic using a mold that shapes the plurality of containers 10. The unitary flat may have any number, size, shape, or arrangement of containers. As compared to a single container 10 (as in FIG. 4), the unitary flat has greater stability against tipping over. Accordingly, the unitary flat may allow greater flexibility in the size and shape of the containers within the flat. For example, a small container with a narrow base and a sidewall that extends upward and outward from the narrow base at a large angle relative to vertical might easily tip over as single container, but may remain in an upright position under a wide range of conditions when the container is formed in a unitary flat with over similar containers.

Figure 8:
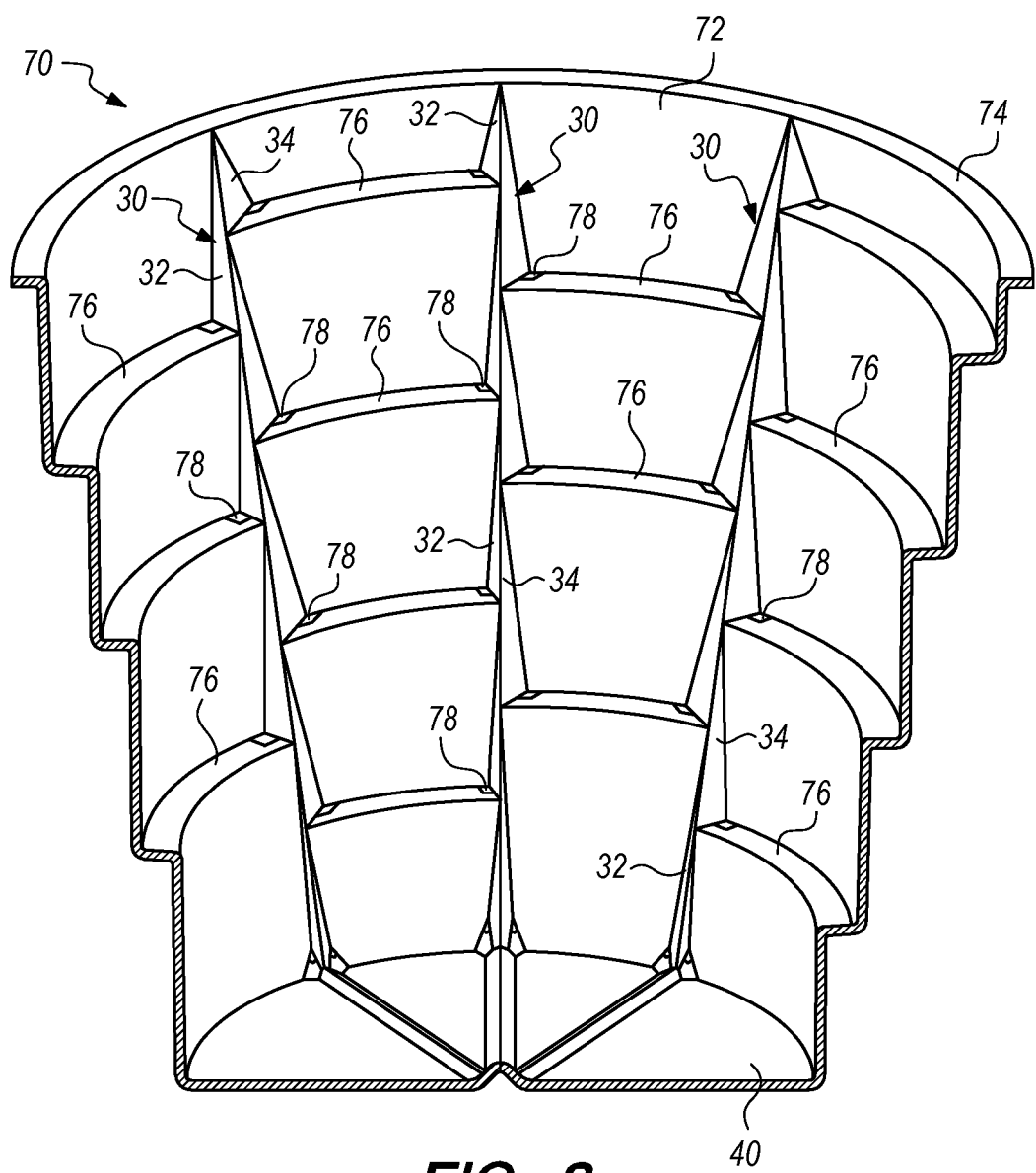
FIG. 8 is a perspective view of one half of a sidewall in an air-root-pruning container for growing plants.

FIG. 8 is a perspective view of one half of a sidewall in an air-root-pruning container 70 for growing plants according to another embodiment. The container 70 includes a base 40 that is similar to that shown in container 10 of FIGS. 1-7. The container 70 further includes a sidewall 72 having a plurality of inwardly projecting ribs 30. Each rib 30 extends upwardly along the sidewall 72 from the base 40 to an open top or rim 74 of the container 70. Each rib is generally V-shaped, with the point directed inwardly toward the center of the container and forming a first side 32 and a second side 34. The first and second sides 32, 34 may be legs that form an open V-shaped channel on the reverse side of the sidewall 20. In fact, the sidewall 72 may have a substantially uniform thickness such that the outside surface of the container 72 may be a complement of the inside surface for the present embodiment.

A plurality of ledges 76 (14 shown) extend along the sidewall 72 from the first side 32 of one rib 30 to the second side 34 of an adjacent rib 30. The ledges 76 are shown in this embodiment having an upwardly facing surface with a consistent width and no particular slope or contour. However, the ledges may have a variable width, one or more slope and various contours. For each ledge 76, a hole 78 is formed through the ledge 76 in a position adjacent the location where the respective ledge extends from one of the ribs 30. As shown, each ledge may have two holes 78, with each hole being adjacent one of the ribs at each end of the ledge. Each hole 78 may be formed in the respective ledge 76 immediately adjacent the respective side 32, 34 of the rib 30 and immediately adjacent the upright portion of the sidewall 72 that extends upward from the ledge. Alternatively, one or more of the holes 78 may be formed in the rib immediately adjacent the ledge and the upright portion of the sidewall, formed in the upright portion of the sidewall immediately adjacent the rib and the ledge, or formed in some combination of two or more of the ledge, rib and upright portion of the sidewall. FIGS. 5A-5D are applicable to the container 70 even though the ledges have a different configuration. In the illustrated non-limiting example, there are three ledges 76 extending from one side of each rib 30 and four ledges 76 extending from another side 34 of the same rib 30.

Note that each of the ledges 76 extending from the first side 32 of the rib 30 are vertically offset from each of the ledges 76 extending from the second side 34 of the rib 30. In particular, the elevations at which each ledge 76 extends from the first side 32 of the rib 30 are different from the elevations at which each ledge 76 extends from the second side 34 of the rib 30. Accordingly, the holes 78 in the ledges 76 on the first side 32 of the rib 30 are not at the same elevation as, or aligned with, the holes 78 in the ledges 76 on the second side 34 of the rib 30. Furthermore, the distance between any two of the holes 78 is greater than the width of the rib 30. As with other embodiments, the number, size, shape and position of the ribs 30 and ledges 76 may vary from that shown.

Figure 9:
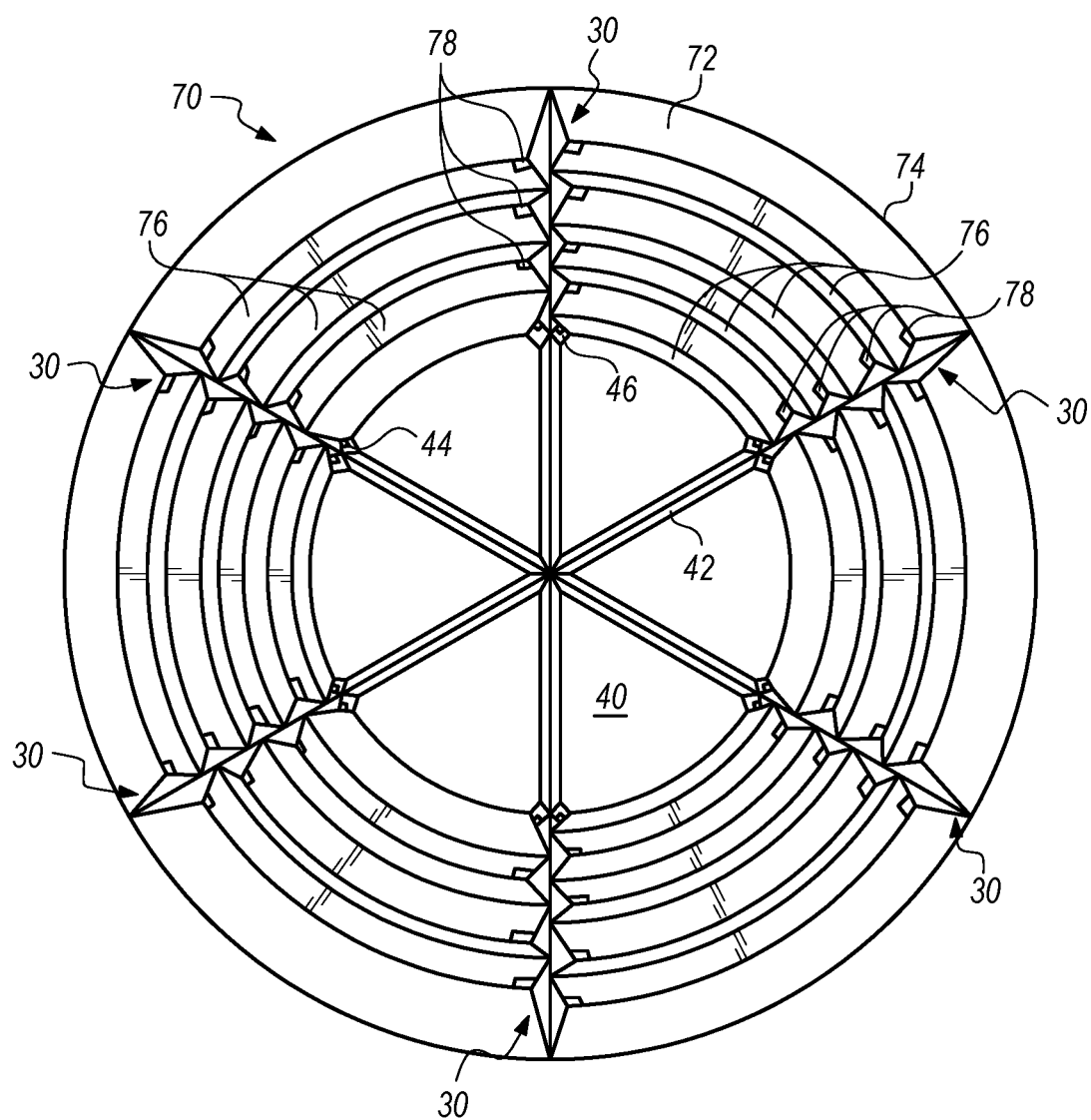
FIG. 9 is a top view of the air-root-pruning container of FIG. 8.

FIG. 9 is a top view of the air-root-pruning container 70 of FIG. 8. However, the container 70 is illustrated having a total of six (6) upwardly extending ribs 30, twenty-one (21) ledges 76, and forty-two (42) air-root pruning holes 78 formed in the ledges 76. The base 40 is shown having six (6) radial ribs 42, twelve (12) inclined portions 46, and twelve (12) holes 44 formed in the inclined portions 44. While the container 70 is shown having a rim 74, the container 70 may be formed in a unitary flat with other containers in the same manner as the flat 60 shown in FIG. 7.

Figure 10:
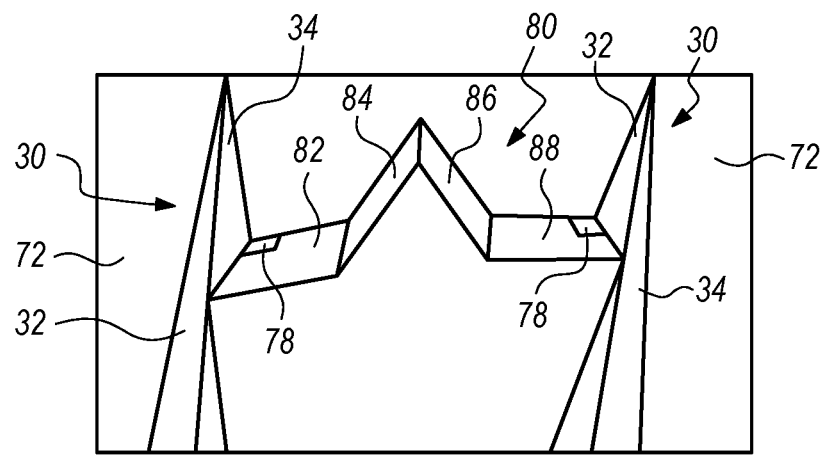
FIG. 10 is a perspective view of an individual ledge having multiple regions with different slopes.

FIG. 10 is a perspective view of an individual ledge 80 having multiple regions with different slopes. In this non-limiting example, the ledge 80 has a first region 82, a second region 84, a third region 86, and a fourth region 88. The middle two regions 84, 86 may form a short rib that may further direct roots toward one of the air-root-pruning holes 78. The number, size, and shape of the regions may vary. However, the ledge 80 may be substituted for any one of more of the ledges 76 in the container 70 of FIGS. 8 and 9 while maintaining the vertically offset ledges on opposing sides of the rib 30.

Figure 11:
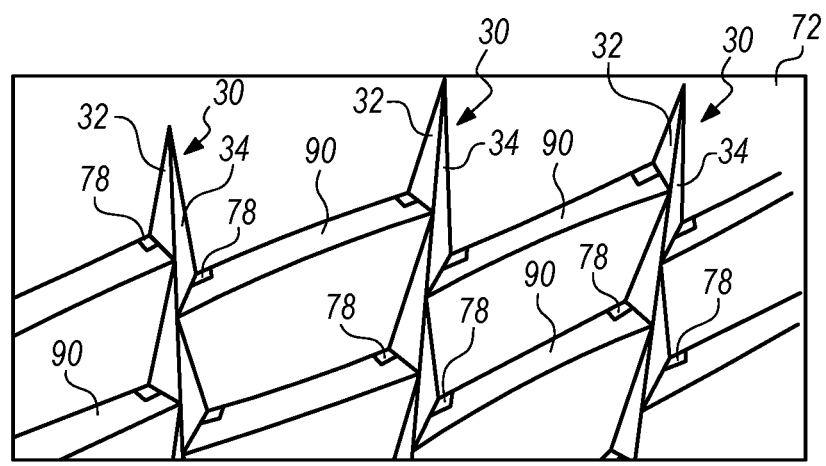
FIG. 11 is a perspective view of a sidewall having continuous ledges that slope from side-to-side in order to provide a vertical offset of the ledges that extend from opposing sides of each rib.

FIG. 11 is a perspective view of a sidewall 72 having continuous ledges 90 that slope from side-to-side in order to provide a vertical offset of the ledges that extend from opposing sides of each rib 30. While each of the ledges 90 may be substantially similar, the elevations where ledges 90 extend from the first side 32 of the rib 30 are still vertically offset from the elevations where ledges 90 extend from the second side 32 of the rib 30. As a result, any two air-root-pruning holes 78 associated with the ledges 90 on opposing sides of the rib 30 are separated by a distance that is greater than the width of the rib 30. Furthermore, some or all of the ledges could slope in the opposite direction while maintaining the vertically offset relationship of the air-root-pruning holes on opposing sides of the rib. The ledges 90 may be substituted for any one of more of the ledges 76 in the container 70 of FIGS. 8 and 9 while maintaining the vertically offset ledges on opposing sides of the rib 30.

Figure 12:
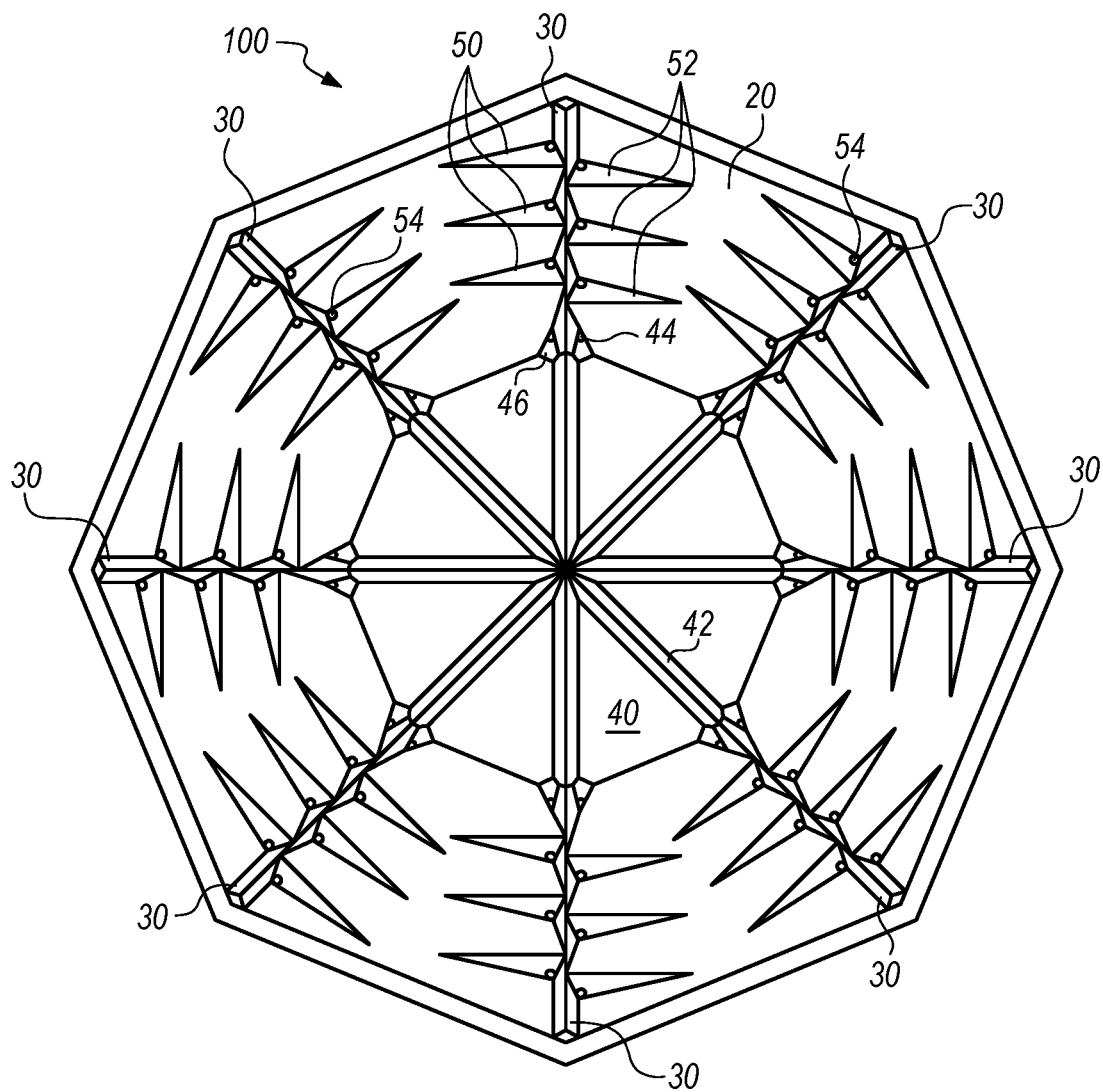
FIG. 12 is a top view of an air-root-pruning container similar to the container of FIG. 4 except that the container is octagonal rather than circular.

FIG. 12 is a top view of an air-root-pruning container 100 similar to the container 10 of FIG. 4 except that the container 100 is octagonal rather than circular. Like parts of the container 100 may be labeled with the same reference numbers used in reference to FIG. 4, such that the description of those parts is not repeated here. The octagonal container 100 has the upwardly extending ribs 30 located at the vertices of the octagonal sidewall.

Figure 13:
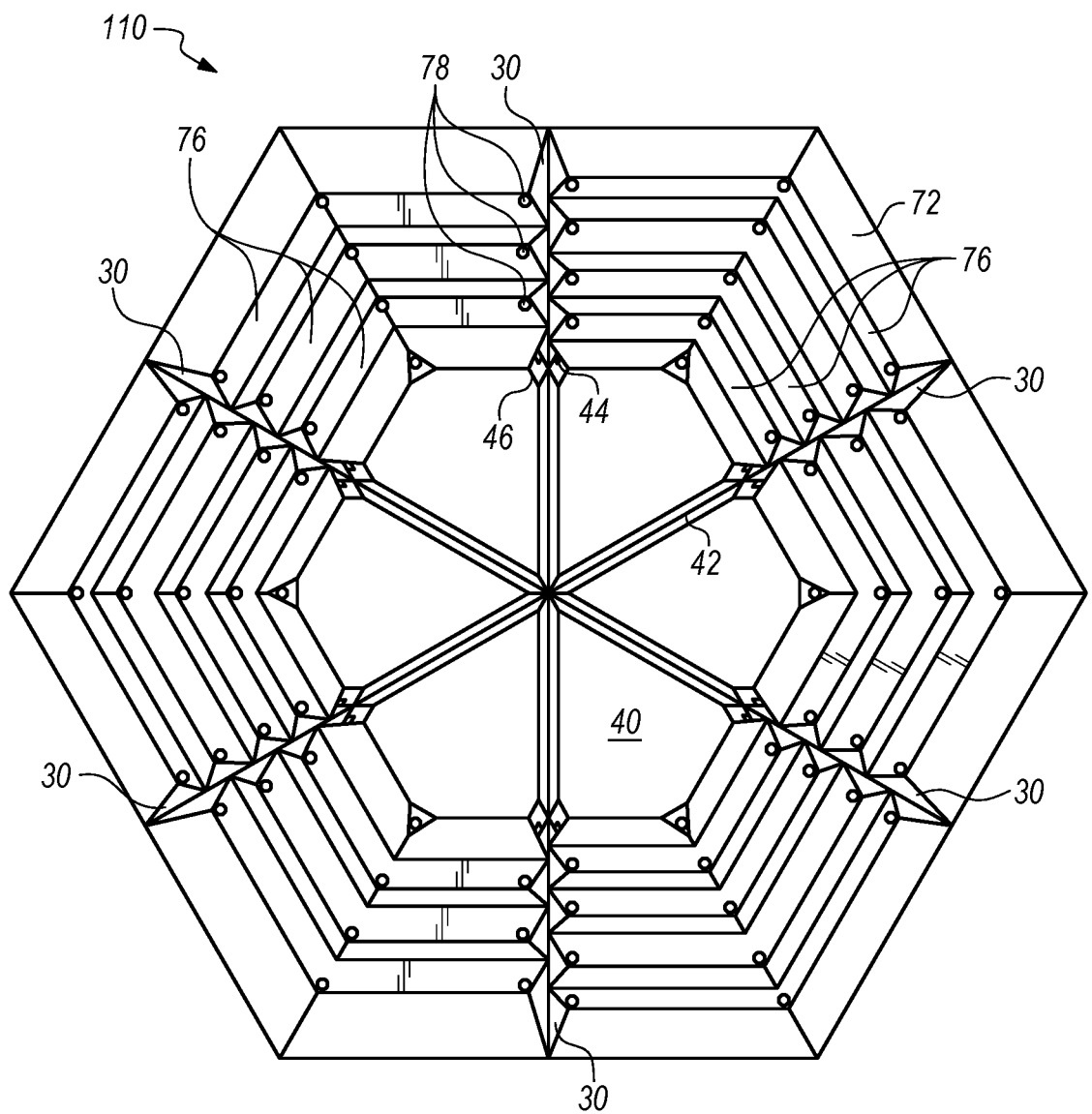
FIG. 13 is a top view of an air-root-pruning container similar to the container of FIG. 9 except that the container is a hexagonal rather than circular.

FIG. 13 is a top view of an air-root-pruning container 110 similar to the container 70 of FIG. 9 except that the container 110 is a hexagonal rather than circular. Like parts of the container 110 may be labeled with the same reference numbers used in reference to FIG. 9, such that the description of those parts is not repeated here. The hexagonal container 110 has the upwardly extending ribs 30 located at a midpoint of the sides of the hexagonal sidewall. The container 110 has been provided with additional air-root-pruning holes at the vertices of the hexagonal sidewall to provide additional air-root-pruning.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An air-root-pruning container for growing a plant, comprising:
    a base; and
    a sidewall upwardly extending from the base, the sidewall including:
        a plurality of inwardly projecting ribs, each rib extending in an upward direction along the sidewall, and each rib having a first side and a second side;
        a plurality of ledges extending from the first side of each rib;
        a plurality of ledges extending from the second side of each rib; and
        a plurality of holes through the sidewall, each hole being positioned adjacent a location where one of the ledges extends from one of the ribs;
        wherein, for each rib, each of the ledges extending from the first side of the rib extend from the rib at a location that is vertically offset from a location where each of the ledges extending from the second side of the rib extend from the rib.

2. The air-root-pruning container of claim 1, wherein, for each rib, each of the ledges extend from the rib in a lateral direction along the sidewall.

3. The air-root-pruning container of claim 1, wherein the first and second sides of each rib form an outward facing channel.

4. The air-root-pruning container of claim 1, wherein, for each rib, each of the plurality of ledges extending from the first side of the rib and each of the plurality of ledges extending from the second side of the rib has an upwardly facing surface that narrows with increasing distance from the rib.

5. The air-root-pruning container of claim 4, wherein, for each rib, each of the plurality of ledges extending from the first side of the rib and each of the plurality of ledges extending from the second side of the rib slopes downwardly toward the rib.

6. The air-root-pruning container of claim 4, wherein any two adjacent ribs of the plurality of ribs includes a first rib and a second rib, and wherein the plurality of ledges extending from the first rib toward the second rib are vertically offset from each of the plurality of ledges extending from the second rib toward the first rib.

7. The air-root-pruning container of claim 1, wherein any two adjacent ribs of the plurality of ribs includes a first rib and a second rib, and wherein the plurality of ledges extending from the first rib toward the second rib and the plurality of ledges extending from the second rib toward the first rib form a plurality of continuous ledges extending along the sidewall from the first rib to the second rib.

8. The air-root-pruning container of claim 7, wherein each of the plurality of continuous ledges have an upward facing surface with a continuous slope between the first rib and the second rib.

9. The air-root-pruning container of claim 7, wherein each of the plurality of continuous ledges have an upward facing surface including two or more regions between the first rib and the second rib, each region having a different slope.

10. The air-root-pruning container of claim 1, wherein, for each rib, the plurality of ledges extending from the first side of the rib and the plurality of ledges extending form the second side of the rib form an alternating side-to-side pattern with distance in the upward direction of the rib.

11. The air-root-pruning container of claim 10, wherein, for each rib, each of the plurality of ledges extending from the first side of the rib are positioned along the rib near a midpoint between two of the plurality of ledges extending from the second side of the rib.

12. The air-root-pruning container of claim 1, wherein, for each rib, a number of ledges in the plurality of ledges extending form the first side of the rib is different than a number of ledges in the plurality of ledges extending from the second side of the rib.

13. The air-root-pruning container of claim 1, wherein the base has a generally circular shape, and wherein the plurality of ribs are generally evenly spaced about a perimeter of the sidewall.

14. The air-root-pruning container of claim 1, wherein the base is a regular convex polygon.

15. The air-root-pruning container of claim 1, wherein the base includes a plurality of inwardly projecting ribs.

16. The air-root-pruning container of claim 15, wherein, for each rib in the sidewall, the rib in the sidewall aligns with one of the plurality of ribs in the base to form a plurality of continuous ribs.

17. The air-root-pruning container of claim 16, further comprising:
    a second plurality of holes, each hole in the second plurality of holes being positioned adjacent a location where one of the continuous ribs turns from the sidewall to the base, and wherein each hole in the second plurality of holes is elevated above a supporting surface of the base.

18. The air-root-pruning container of claim 1, the base and sidewalls do not include any backslopes that would prevent separation of the container from a vacuum forming mold.

19. An apparatus comprising a unitary flat that includes a plurality of the air-root-pruning containers of claim 1.

* * * * *